US009557757B2

(12) United States Patent
Potanin et al.

(10) Patent No.: US 9,557,757 B2
(45) Date of Patent: *Jan. 31, 2017

(54) SCALING VOLTAGE REGULATORS TO ACHIEVE OPTIMIZED PERFORMANCE

(71) Applicant: Vivid Engineering, Inc., San Jose, CA (US)

(72) Inventors: Vladislav Potanin, San Jose, CA (US); Elena Potanina, San Jose, CA (US); George McLean, Berkeley, CA (US); Pavel Biryulin, Moscow (RU)

(73) Assignee: Vivid Engineering, Inc., San Jose, CA (US)

( * ) Notice: Subject to any disclaimer, the term of this patent is extended or adjusted under 35 U.S.C. 154(b) by 149 days.

This patent is subject to a terminal disclaimer.

(21) Appl. No.: 14/613,273

(22) Filed: Feb. 3, 2015

(65) Prior Publication Data

US 2015/0349631 A1 Dec. 3, 2015

Related U.S. Application Data

(63) Continuation-in-part of application No. 14/287,202, filed on May 27, 2014.
(Continued)

(51) Int. Cl.
*G05F 1/618* (2006.01)
*G05F 1/575* (2006.01)
(Continued)

(52) U.S. Cl.
CPC ............. *G05F 1/618* (2013.01); *G05B 13/042* (2013.01); *G05F 1/575* (2013.01); *H02M 1/08* (2013.01); *H02M 3/156* (2013.01)

(58) Field of Classification Search
CPC .. H02M 1/08; H02M 1/32; H02M 2003/1566; H02M 11/00; G05F 1/462; G05F 1/465; G05F 1/575; G05F 1/571; G05F 1/618; G05B 13/041; G05B 13/042
See application file for complete search history.

(56) References Cited

U.S. PATENT DOCUMENTS 3,750,005 A * 7/1973 Downes, Jr. ............ H02M 3/28
363/49
6,046,577 A 4/2000 Rincon-Mora et al.
(Continued)

OTHER PUBLICATIONS

Jacobs, "CMOS circuit design, layout, and simulation", Second edition, Wiley, Published on Jan. 16, 2005.

*Primary Examiner* — Fred E Finch, III
(74) *Attorney, Agent, or Firm* — Turk IP Law, LLC (57) ABSTRACT

Technologies are generally described for scaling a voltage regulator implemented as an integrated circuit (IC) that includes a power transistor configured to convert an input voltage to an output voltage, and a feedback loop configured to regulate the output voltage in response to a voltage change. At least one component of the voltage regulator may be selected for scaling, and a range of scaling factors may be identified for the component. An optimal coefficient may be determined for the scaling factors within the identified range through an empirical formulation and/or by running a circuit simulation based on parameters associated with voltage, load current, and load capacitance, for example. The optimal coefficient may be a coefficient that when applied to the component optimizes the performance of the IC and thus, the component may be scaled based on the optimal coefficient to achieve an optimized performance of the IC.

13 Claims, 7 Drawing Sheets

Related U.S. Application Data (60) Provisional application No. 61/929,935, filed on Jan. 21, 2014.

(51) Int. Cl.
  G05B 13/04  (2006.01)
  H02M 1/08  (2006.01)
  H02M 3/156  (2006.01)

(56) References Cited

U.S. PATENT DOCUMENTS

| | | | |
|---|---|---|---|
| 6,300,749 B1 | 10/2001 | Castelli et al. | |
| 6,603,292 B1 | 8/2003 | Schouten | |
| 6,977,490 B1 | 12/2005 | Zhang et al. | |
| 7,723,968 B2 | 5/2010 | Okuyama et al. | |
| 7,843,180 B1 | 11/2010 | Cilingiroglu | |
| 7,893,671 B2 | 2/2011 | Sahni et al. | |
| 7,902,801 B2 | 3/2011 | Mandal | |
| 8,054,055 B2 | 11/2011 | Mandal | |
| 8,154,263 B1 | 4/2012 | Shi et al. | |
| 8,154,265 B2 | 4/2012 | Napravnik | |
| 8,159,207 B2 | 4/2012 | Ivanov et al. | |
| 8,169,203 B1 | 5/2012 | Vemula | |
| 8,222,877 B2 | 7/2012 | Cerchi et al. | |
| 8,242,761 B2 | 8/2012 | Napravnik | |
| 8,289,009 B1 | 10/2012 | Strik et al. | |
| 8,305,066 B2 | 11/2012 | Lin et al. | |
| 8,324,876 B1 | 12/2012 | Le et al. | |
| 8,344,713 B2 | 1/2013 | Shrivas et al. | |
| 8,760,133 B2 | 6/2014 | Hasegawa et al. | |
| 2003/0102851 A1 | 6/2003 | Stanescu et al. | |
| 2003/0178976 A1 | 9/2003 | Xi | |
| 2003/0199997 A1* | 10/2003 | Gao | G05B 5/01 700/18 |
| 2004/0004468 A1 | 1/2004 | Dearn et al. | |
| 2004/0100235 A1* | 5/2004 | Lee | G05F 1/465 323/282 |
| 2004/0183588 A1* | 9/2004 | Chandrakasan | G05F 3/205 327/545 |
| 2006/0170404 A1 | 8/2006 | Amrani et al. | |
| 2009/0009147 A1 | 1/2009 | Jian | |
| 2011/0276938 A1* | 11/2011 | Perry | G06F 17/5036 716/133 |
| 2012/0299564 A1 | 11/2012 | Howes et al. | |
| 2013/0162235 A1* | 6/2013 | Harada | H02M 3/156 323/283 |
| 2013/0257401 A1 | 10/2013 | Fort et al. | |
| 2013/0321076 A1* | 12/2013 | Galbis | H03F 1/0216 330/127 |
| 2014/0266104 A1 | 9/2014 | El-Nozahi et al. | |
| 2015/0207406 A1* | 7/2015 | Potanin | G05F 1/618 323/282 |

\* cited by examiner

SCALING VOLTAGE REGULATORS TO ACHIEVE OPTIMIZED PERFORMANCE

CROSS-REFERENCE TO RELATED APPLICATIONS

This Application is a continuation-in-part to co-pending U.S. patent application Ser. No. 14/287,202 filed on May 27, 2014, which claims priority to U.S. Provisional Application Ser. No. 61/929,935 filed on Jan. 21, 2014 by the same inventors, commonly assigned herewith. Therefore, both applications are herein incorporated by reference in their entireties.

BACKGROUND

Unless otherwise indicated herein, the materials described in this section are not prior art to the claims in this application and are not admitted to be prior art by inclusion in this section.

Current voltage regulators implemented as integrated circuits (ICs) may include components such as an error amplifier, a power device, and a feedback, for example, where the components may lack scalability. The purpose of the voltage regulator may be to maintain an output voltage at a particular value regardless of a fluctuation in current consumed by a load of the IC. The voltage regulator may maintain the output voltage by implementing a regulation loop to sense a difference of the output voltage from the particular value and adjust conductivity of the power device in order to compensate for the sensed difference. Current attempts to design such voltage regulators may face operational difficulties, such as lack of stability under a variety of operating conditions, and transient output voltage fluctuations in response to a sudden change in the current consumed by a load of the IC, preventing optimal IC performance.

SUMMARY

The present disclosure generally describes techniques to scale a voltage regulator, where the voltage regulator may be implemented as an integrated circuit (IC). The scalability and design of the voltage regulator may enable an optimized performance of the IC, as well as an increase in a stability of the IC and minimization of fluctuations in output voltage in response to sudden changes in a current consumed by a load of the IC.

According to some examples, methods to scale a voltage regulator to achieve optimized performance are provided. An example method may include selecting at least one component of the voltage regulator to scale, identifying a range of scaling factors for the component, the range comprising one or more coefficients for the scaling factors, determining an optimal coefficient for the scaling factors within the identified range for the component, and scaling the component based on the optimal coefficient such that an optimized performance of the voltage regulator is achieved.

According to other examples, scalable voltage regulators are described. An example scalable voltage regulator may include a power transistor configured to receive an input voltage from a voltage source and convert the input voltage to an output voltage, and a feedback loop configured to regulate the output voltage in response to a change of output voltage from a desired level caused by a change of a current consumed by a load or changes of other operating conditions. The feedback loop may include an error amplifier configured to determine a value difference between the output voltage or portion of the output voltage and a reference output voltage, and amplify the value difference. The feedback loop may also include a voltage divider, where an input of the voltage divider is coupled to an output of the voltage regulator, and an output of the voltage divider is coupled to an input of the error amplifier, the voltage divider configured to receive an output voltage of the voltage regulator, and generate voltage proportional to an input voltage of the voltage divider with a specific ratio. The feedback loop may further include a first unity gain buffer coupled to the power transistor and the error amplifier, the first unity gain buffer configured to receive a first control signal based on the output voltage of the error amplifier, and provide a second control signal to the power transistor without signal amplification or attenuation. One or more of the power transistor, the error amplifier, and the first unity gain buffer may be selected to be scaled based on a range of load capacitance and a range of current associated with the voltage regulator such that an optimized performance of the voltage regulator is achieved.

According to further examples, systems to scale a voltage regulator to achieve optimized performance are provided. An example system may include a component selection module configured to select at least one component of the voltage regulator to scale, where the component may be a power transistor, an error amplifier, a first unity gain buffer, a second unity gain buffer, one or more compensation capacitors, or an overshoot suppressor circuit. The example system may also include a fabrication module configured to fabricate the component to scale based on an optimal coefficient, where a range of scaling factors, comprising one or more coefficients for the scaling factors, may be identified for the component, and the optimal coefficient may be determined for the scaling factors within the identified range for the component. The example system may further include an assembly module configured to assemble the scaled component with one or more remaining components to form the voltage regulator, and a controller configured to coordinate operations of the component selection module, the fabrication module, and the assembly module.

The foregoing summary is illustrative only and is not intended to be in any way limiting. In addition to the illustrative aspects, embodiments, and features described above, further aspects, embodiments, and features will become apparent by reference to the drawings and the following detailed description.

BRIEF DESCRIPTION OF THE DRAWINGS

The foregoing and other features of this disclosure will become more fully apparent from the following description and appended claims, taken in conjunction with the accompanying drawings. Understanding that these drawings depict only several embodiments in accordance with the disclosure and are, therefore, not to be considered limiting of its scope, the disclosure will be described with additional specificity and detail through use of the accompanying drawings, in which:

DETAILED DESCRIPTION

In the following detailed description, reference is made to the accompanying drawings, which form a part hereof. In the drawings, similar symbols typically identify similar components, unless context dictates otherwise. The illustrative embodiments described in the detailed description, drawings, and claims are not meant to be limiting. Other embodiments may be utilized, and other changes may be made, without departing from the spirit or scope of the subject matter presented herein. The aspects of the present disclosure, as generally described herein, and illustrated in the Figures, can be arranged, substituted, combined, separated, and designed in a wide variety of different configurations, all of which are explicitly contemplated herein.

This disclosure is generally drawn, inter alia, to methods, apparatus, systems, devices, and/or computer program products related to scaling one or more components of a voltage regulator.

Briefly stated, technologies are generally described for scaling a voltage regulator implemented as an integrated circuit (IC) that includes a power transistor configured to convert an input voltage to an output voltage, and a feedback loop configured to regulate the output voltage in response to a voltage change. At least one component of the voltage regulator may be selected for scaling, and a range of scaling factors may be identified for the component. An optimal coefficient may be determined for the scaling factors within the identified range through an empirical formulation and/or by running a circuit simulation based on parameters associated with voltage, load current, and load capacitance, for example. The optimal coefficient may be a coefficient that when applied to the component optimizes the performance of the IC for the given parameters and thus, the component may be scaled based on the optimal coefficient to achieve an optimized performance of the IC.

Figure 1:
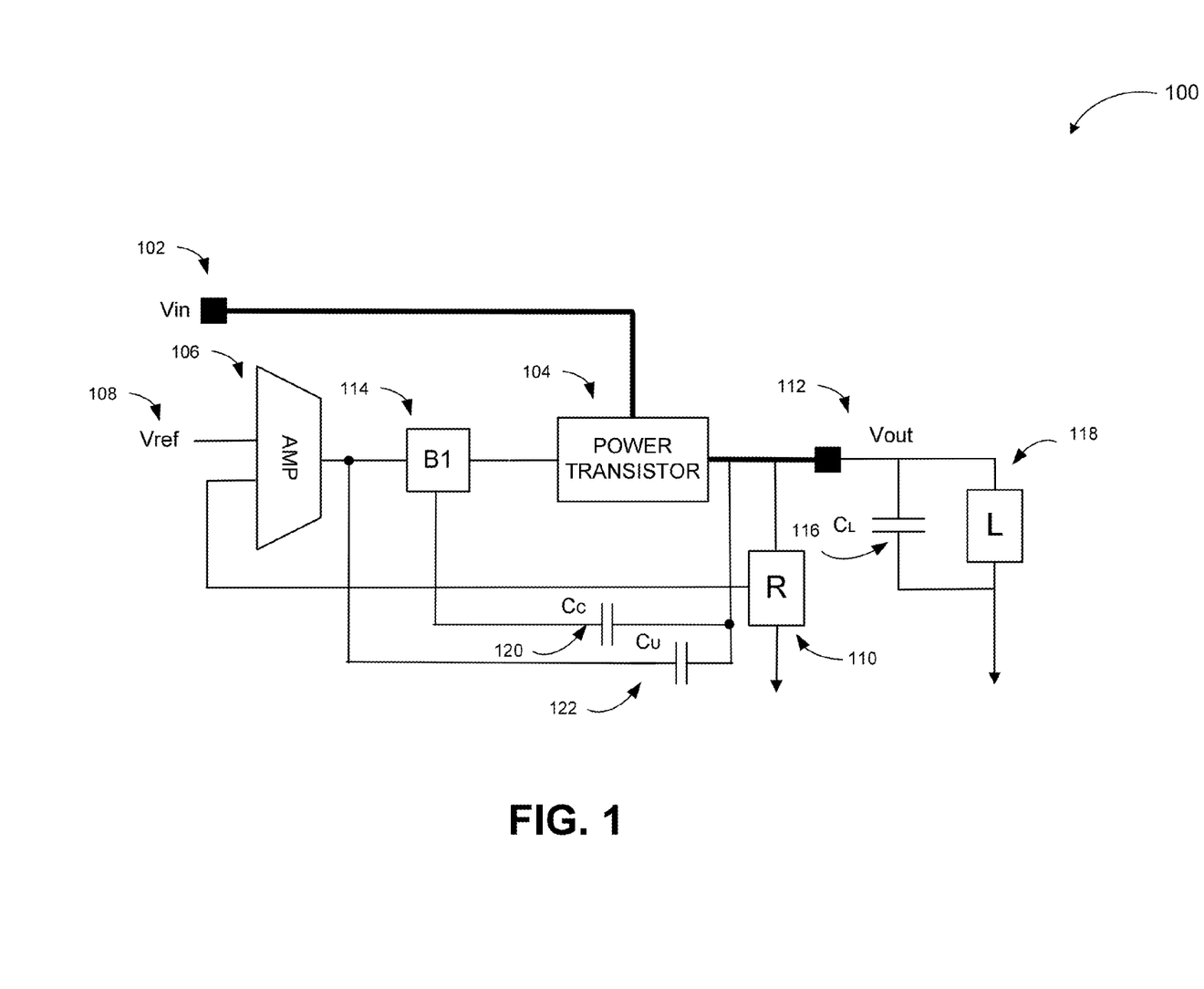
FIG. 1 illustrates an example scalable voltage regulator with increased stability.

FIG. 1 illustrates an example scalable voltage regulator with increased stability, arranged in accordance with at least some embodiments described herein.

As shown in a diagram 100, one or more components of a voltage regulator implemented as an IC may include a power transistor 104, an error amplifier 106, a voltage divider 110, a unity gain buffer 114 and one or more compensation capacitors 120 and 122. An output of the voltage regulator may be coupled to a load 118 of the IC in a particular orientation, such as a serial orientation.

An input of the voltage divider 110 may be coupled to the output of the voltage regulator, and an output of the voltage divider 110 may be coupled to an input of the error amplifier 106. An output of the error amplifier 106 may be coupled to the power transistor 104, which may be coupled to both an input and the output of the voltage regulator, forming a feedback loop providing regulation of output voltage 112.

In some embodiments, at least one of the components, such as the power transistor 104, the error amplifier 106, the unity gain buffer 114, and/or one or both of the compensation capacitors 120 and 122 may be selected to be scaled. The component to be scaled may be selected based on a range of load capacitance 116 and a range of current associated with the IC. A range of scaling factors may be identified for the component, where the range includes one or more coefficients for the scaling factors, and an optimal coefficient for the scaling factors may be determined within the identified range through an empirical formulation and/or by running a circuit simulation. When two or more components are selected to be scaled, the range of scaling factors may be identified for each component, and an optimal combination of coefficients for the scaling factors may be determined within the respective identified ranges through the empirical formulation and/or by running the circuit simulation.

For example, an empirical formula for a function that defines a relationship between one or more IC parameters and the coefficients for the scaling factors may be drafted. The formula may then be solved to calculate the optimal coefficient for the scaling factors of the component for given IC parameters, or the optimal combination of coefficients for the scaling factors of the two or more components for the given IC parameters. The IC parameters may include a target output voltage, a minimum and maximum input voltage, a maximum load current, a minimal and maximal load capacitance, and/or a maximum instant change of the load current, for example.

Alternatively, the optimal coefficient or optimal combination of coefficients may be determined by applying each coefficient within the identified range to the respective component(s) to simulate a performance of the IC, where all possible combinations of coefficients may be simulated. In one example, a model of the scalable voltage regulator suitable for simulating an operation of the IC under various operating conditions may be created with the aid of a circuit simulation computer program. The model of the regulator may be modified to represent each combination of the coefficients, and then simulated under various operating conditions yielding simulated or predicted parameters for each combination. The operating conditions may include input voltage, output voltage, maximum load current, load capacitance, ambient temperature, and process variation, among other operating conditions. The simulated parameters may include static and transient load and line regulation, and idle and full-load current consumption, among other parameters. Simulation may be repeated for each unique combination of coefficients and operating conditions, and the simulated parameters can be extracted from simulation results. The extracted simulated parameters may be stored in a searchable database to enable efficient identification of an optimal coefficient for each component and/or an optimal combination of coefficients for the two or more components of the voltage regulator, which when implemented for the scalable voltage regulator will cause the IC to demonstrate optimal parameters for a particular combination of operating conditions and requirements. The components may then be scaled based on the optimal coefficients determined for each component such that an optimized performance of the IC may be achieved.

The component(s) may be fabricated to scale prior to assembly with one or more remaining components to form the IC. Alternatively, the IC may be assembled with additional circuitry such that the component(s) may be scaled during operation of the IC in response to changes in IC parameters, and thus, changes to the optimal coefficients for each component. For example, in response to a determination that the load 118 of the IC is operating in a light or power saving mode, one or more of the components may be scaled during operation to reduce an idle current of the IC.

The power transistor 104 may be configured to receive an input voltage 102 from a voltage source, and convert the input voltage 102 to an output voltage 112, which may be the output voltage 112 of the voltage regulator. A size of the power transistor 104 may be selected based on the maximum load current and the minimum input voltage requirement, selected based on one or more design rules, and/or selected such that multiplication is enabled, for example.

The voltage divider 110 may be a resistive divider, for example. The voltage divider 110 may be configured to receive the output voltage 112 of the voltage regulator, and generate voltage proportional to an input voltage of the voltage divider (output voltage 112 of the voltage regulator) with a specific ratio. The error amplifier 106 may be an operational trans-conductance amplifier (OTA), for example. The error amplifier 106 may be configured to determine a value difference of the output voltage 112 or at least a portion of the output voltage 112 and a reference output voltage 108. The reference output voltage 108 may be a desired output voltage level, for example. Once the value difference is determined, the error amplifier 106 may amplify a first signal control based on the value difference.

The unity gain buffer 114 coupled to the power transistor 104 and the error amplifier 106 may be configured to receive the first control signal from the error amplifier, and provide a second control signal to the power transistor 104. The second control signal may be provided without signal amplification or attenuation of the second control signal, which may provide stability to the IC under a variety of operating conditions, such as a range of load capacitance 116 values. For example, the load capacitance 116 values may range from a few pF to several hundred μF. The unity gain buffer 114 may be a transistor in a common base configuration or a transistor in a common gate configuration, for example. A conductivity of the power transistor 104 may be adjusted based on the provided second signal control such that the value difference may be eliminated between the output voltage 112 and the reference output voltage 108.

The voltage regulator may further include the compensation capacitors 120 and 122 to provide further stability to the IC. The compensation capacitor 122 between an output of the error amplifier 106 and an output of the voltage regulator may change a frequency response of the error amplifier 106 such that overall transfer function of the regulation loop may confirm to stability criteria. For example, the stability criteria may be a phase shift less than 180 degrees minus adequate margin (i.e., at least 10 degree) at a frequency where open loop gain decreases to zero decibel. The compensation capacitor 120 may be coupled to an output of the unity gain buffer 114 and an output of the voltage regulator, to serve as an additional alternating current (AC) regulation loop for fast transitions.

Figure 2:
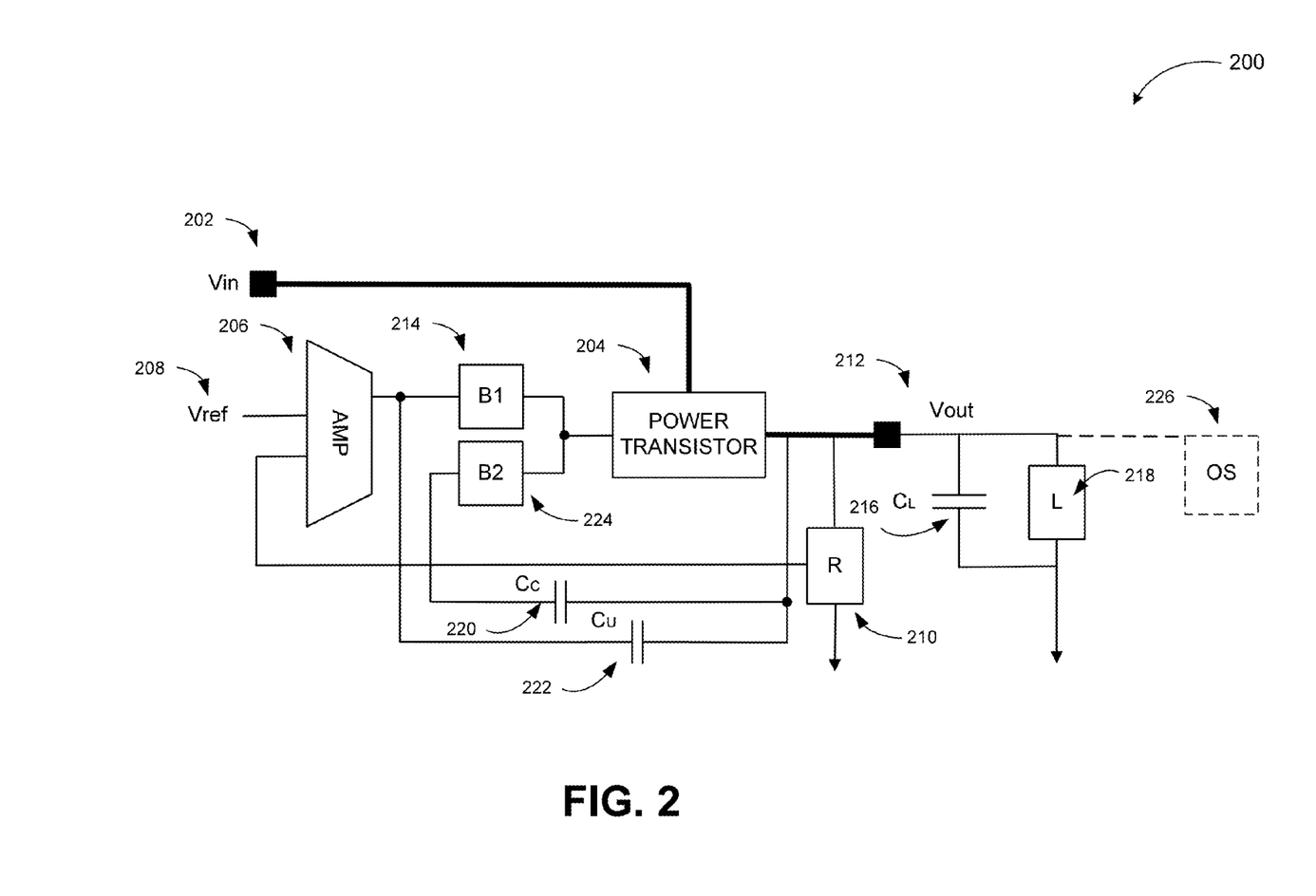
FIG. 2 illustrates an example scalable voltage regulator with increased stability that enables output voltage fluctuations to be minimized in response to a change in load from a low level to a high level.

FIG. 2 illustrates an example scalable voltage regulator with increased stability that enables output voltage fluctuations to be minimized in response to a change in load from a low level to a high level, arranged in accordance with at least some embodiments described herein.

As shown in a diagram 200, one or more components of a voltage regulator implemented as an IC may include a power transistor 204, an error amplifier 206, a voltage divider 210, a first unity gain buffer 214, a second unity gain buffer 224, and one or more compensation capacitors 220 and 222. An output of the power transistor 204 may be coupled to a load 218 of the IC in a particular orientation, such as a serial orientation.

An input of the voltage divider 210 may be coupled to the output of the voltage regulator, and an output of the voltage divider 210 may be coupled to an input of the error amplifier 206. An output of the error amplifier 206 may be coupled to the power transistor 204, which may be coupled to both an input and the output of the voltage regulator, forming a feedback loop providing regulation of output voltage 212.

In some embodiments, one or more components of the voltage regulator may be scaled to achieve an optimized performance of the IC. For example, at least one of the power transistor 204, the error amplifier 206, the first unity gain buffer 214, the second unity gain buffer 224 and/or one or both of the compensation capacitors 220 and 222 may be selected to be scaled. The component(s) to be scaled may be selected based on a range of load capacitance 216 and a range of current associated with the voltage regulator. For example, load capacitance values may range from about a few pF to several hundred μF, and current values may range from about tens of micro ampere up to few ampere.

A range of scaling factors may be identified for the component(s), where the range may include one or more coefficients for the scaling factors. In an example scenario, a scaling factor, S0, may be identified for the power transistor 204, with a defined range of coefficients from 1 to 256. Scaling factors, S1 and S2, may be identified for the first unity gain buffer 214 and the second unity gain buffer 224, respectively, with a defined range of coefficients from 1 to 32 for each. Scaling factors, Sc and Su, may be identified for the compensation capacitors 220 and 222, respectively, with a defined range of coefficients from 1 to 128 for each. A scaling factor, Sa, may be identified for the error amplifier 206 with a defined range of coefficients from 1 to 16. Accordingly, the number of possible combinations of coefficients for above-described scaling factors is N=256*32*32*128*128*16, or about 67 billion combinations representing a finite design space for the scalable voltage regulator.

An optimal coefficient for the scaling factors for a component, or an optimal combination of coefficients for the scaling factors of two or more components may then be determined within the identified range through an empirical formulation and/or by running a circuit simulation. For example, an empirical formula for a function that defines a relationship between IC parameters and the coefficients for the scaling factors of the component may be drafted. The formula may then be solved to calculate the optimal coefficient for the scaling factors of the component for given IC parameters, or the optimal combination of coefficients for the scaling factors of the two or more components for the given IC parameters. The IC parameters may include a target output voltage, a minimum and maximum input voltage, a maximum load current, a minimal and maximal load capacitance, and/or a maximum instant change of the load current, for example.

In an example scenario, the power transistor 204 may be configured as parallel connection of identical unit transistors of p-MOS type. Size of the unit transistor may be selected to be sufficient for delivering minimal load current while number of used minimal transistors N will be a scaling value. The size of the unit transistor may be calculated as $$\frac{W}{L} = \frac{I_{Lmin}}{S}(V_{INmin} - V_{TH} - 0.4)^{-2}$$

where W and L are width and length of the gate of the unit transistor respectively, $I_{Lmin}$ is a minimal load current, $V_{INmin}$ is a minimal input voltage, S is a transconductance of a transistor with W=L, and $V_{TH}$ is a threshold voltage of the transistor. The integer scaling value N for maximum load current can be calculated, for example, with following equation:

$$N = \text{int}\left(\frac{I_{Lmax}}{I_{Lmin}}\right).$$

As a particular numerical example, we may select minimal input voltage $V_{INmin}$=2.25V, minimal load current $I_{Lmin}$=80 uA, transconductance S=20 uA/V², threshold voltage $V_{TH}$=0.6V, and gate length L=280 nm as minimal allowed by the design rules for selected process technology, then unit transistor size W shall be 720 nm, and for maximum load current $I_{Lmax}$=20 mA, scaling value N will be 250.

Alternatively, the optimal coefficient or combination of optimal coefficients may be determined by applying each coefficient within the identified range to the respective component(s) to simulate a performance of the IC. In one example, a model of the scalable voltage regulator suitable for simulating an operation of the IC under various operating conditions may be created with the aid of a circuit simulation computer program. The model of the regulator may be modified to represent each combination of the scaling coefficients, and then simulated under various operating conditions yielding simulated or predicted parameters for each combination. The operating conditions may include input voltage, output voltage, maximum load current, load capacitance, ambient temperature, and process variation, among other operating conditions. The simulated parameters may include static and transient load and line regulation, and idle and full-load current consumption, among other parameters. Simulation may be repeated for each unique combination of scaling coefficients and operating conditions, and the simulated parameters can be extracted from simulation results. The extracted simulated parameters may be stored in a searchable database to enable efficient identification of an optimal coefficient for each component and/or an optimal combination of coefficients for the components of the IC, which when implemented will cause the IC to demonstrate optimal parameters for the particular combination of operating conditions and requirements.

Additionally, a size of a voltage regulator that may be implemented as a monolithic IC in a particular process technology may be calculated for each combination of scaling factors and such values can be placed in the same database. A number of simulations and correspondent entries in the database may be determined by multiplying a number of all possible combinations of scaling factors and operating conditions. For instance, selecting five operational parameters each with three values (for example, minimal, typical, and maximal) would lead the number of simulations and correspondent entries in the database to exceed 16 trillion.

A modification of the above example may include improvements for limiting a size of the database. Such improvements may include a computer program that limits a total number of combinations of coefficients used for simulation by excluding combinations that theoretically will cause the IC to operate improperly or demonstrate unacceptable parameters for a given IC topology. For example, a range for the scaling factor, S1, identified for the first unity gain buffer 214 may be reduced to 3 coefficients instead of 16 while being calculated as follows: {int(S0/16)−1; int(S0/16); int(S0/16)+1}.

Another modification for reducing a size of the database is to implement a computer program that analyses simulation results and prevents entering combinations of coefficients that predict improper operation or poor parameters of the IC into the database. Additionally, or alternatively, a computer program that initially obtains simulation results for only a subset of the possible combinations of coefficients may be implemented to exclude unsuitable combinations of coefficients from the database. For example, the computer program may choose a subset that sparsely covers some or all of the design space, and to refine the coverage of the design space selectively, may use the results of previous simulations to guide the choice of which other combinations of coefficients to simulate and which to exclude.

In some embodiments, a computer program may be used to identify the optimal combination of coefficients for the scaling factors of the components for a particular combination of operating conditions and required parameters. While interacting with the computer program, a user (particularly a user who is skilled in the art) may input required values for operating conditions and desired parameters to observe if there are any entries in the database that satisfy such requirements, and thus correspond to an optimal combination of coefficients. If multiple entries are found within the database, the user can change any condition or requirement to a more desired value such as lower idle current consumption, and smaller size, among other examples. Eventually the optimal combination of coefficients may be identified, which when implemented for the IC will cause the IC to demonstrate optimal parameters for the particular combination of operating conditions and requirements. In another implementation, a figure of merit specific to the user's needs may be defined based on user input. The input may be, for example, minimum and maximum allowed values or target values and tolerances, and may be applied to the operating conditions, IC parameters or combinations thereof. The user may then be presented one or more suitable choices, each corresponding to a particular combination of coefficients, ranked according to the figure of merit.

Once an optimal combination of coefficients for the scaling factors of components are determined for a particular set of operating conditions and required parameters, the computer program may be implemented to generate a layout of the voltage regulator that further may be used for manufacturing the voltage regulator as a monolithic IC in a particular process technology. The computer program may include computer executable code containing information on predefined relative positions of each component of the voltage regulator. The computer program may use input data on certain layout design rules for a particular process technology together with the optimal combination of coefficients, and calculate actual sizes and positions of the elements culminating with generation of an output data file that contains entire encoded layout of the voltage regulator. In addition to calculating the size and position of the components, the program may also compute whether to include or exclude certain components entirely.

A modification of the above example scenario may include extension of the layout generation program by adding multiple variants of a computer executable code with different pre-defined relative positions of the components in the voltage regulator (for example, floor plans) with an algorithm for selecting particular variant of such code depending on value of the one or more scaling coefficients.

For example, the program may contain 3 variants of floor plans where a first variant is selected if input scaling factor, S0, for the power transistor falls in a first sub-range {1:64} of values, a second variant is selected when S0 falls in a second sub-range {65:128}, and a third variant is selected when S0 falls in a third sub-range {129:256}.

Another modification of the above example scenario may include a layout generation program that targets a user-defined aspect ratio or bounding box for the complete voltage regulator layout by separating capacitors or other components into smaller units and placing those units in such a way as to achieve the desired aspect ratio or bounding box.

Once the component(s) are scaled and the voltage regulator is assembled, the power transistor 204 may be configured to receive an input voltage 202 from a voltage source, and convert the input voltage 202 to an output voltage 212, which may be the output voltage 212 of the voltage regulator. A size of the power transistor 204 may be selected based on the maximum load current and the minimum input voltage requirement, selected based on one or more design rules, and/or selected such that multiplication is enabled, for example.

The voltage divider 210 may be a resistive divider configured to receive the output voltage 212 of the voltage regulator, and generate voltage proportional to an input voltage of the voltage divider with a specific ratio. The error amplifier 206 may be an OTA configured to determine a value difference of the output voltage 212 or at least a portion of the output voltage 212 and a reference output voltage 208. The reference output voltage 208 may be a desired output voltage level, for example. Once the value difference is determined, the error amplifier 206 may amplify a first signal control based on the value difference.

The first unity gain buffer 214 coupled to the power transistor 204 and the error amplifier 206 may be configured to receive the first control signal from the error amplifier, and provide a second control signal to the power transistor 204. The second control signal may be provided without signal amplification or attenuation of the second control signal, which may provide stability to the IC under a variety of operating conditions, such as the range of load capacitance 216 values. The first unity gain buffer 214 may be a transistor in a common base configuration or a transistor in a common gate configuration, for example. A conductivity of the power transistor 204 may then be adjusted based on the provided second signal control such that the value difference may be eliminated between the output voltage 212 and the reference output voltage 208.

The voltage regulator may further include the compensation capacitors 220 and 222 to provide further stability to the IC. The compensation capacitor 222 between an output of the error amplifier 206 and an output of the voltage regulator may change a frequency response of the error amplifier 206 such that overall transfer function of the regulation loop may conform to stability criteria. The compensation capacitor 220 may be coupled to an output of the first unity gain buffer 214 and an output of the voltage regulator, to serve as an additional AC regulation loop for fast transitions.

As discussed previously, the output of the power transistor 204 may be coupled to a load 218 of the IC. Sudden changes in a current consumed by the load 218 may affect the load capacitance 216, which in turn may cause transient fluctuations of the output voltage 212 of the power transistor 204. In other examples, sudden changes in other operating conditions of the IC may cause the transient fluctuations of the output voltage 212. Introduction of the second unity gain buffer 224 may minimize these transient fluctuations, where the second unity gain buffer 224 may be coupled to the power transistor 204. For example, the second unity gain buffer 224 may reduce a drop in the output voltage 212 when a current consumed by the load 218 suddenly changes from a low current to a high current, also termed undershoot. The second unity gain buffer 224, similar to the first unity gain buffer 214, may be a transistor in a common base configuration or a transistor in a common gate configuration, for example.

In other embodiments, an optional overshoot suppressor circuit 226 may be coupled to the load 218 in a parallel orientation, as illustrated in FIG. 2. The optional overshoot suppressor circuit 226 may be configured to reduce a rise in the output voltage 212 when a current consumed by the load 218 suddenly changes from a high current to a low current, termed an overshoot.

Figure 3:
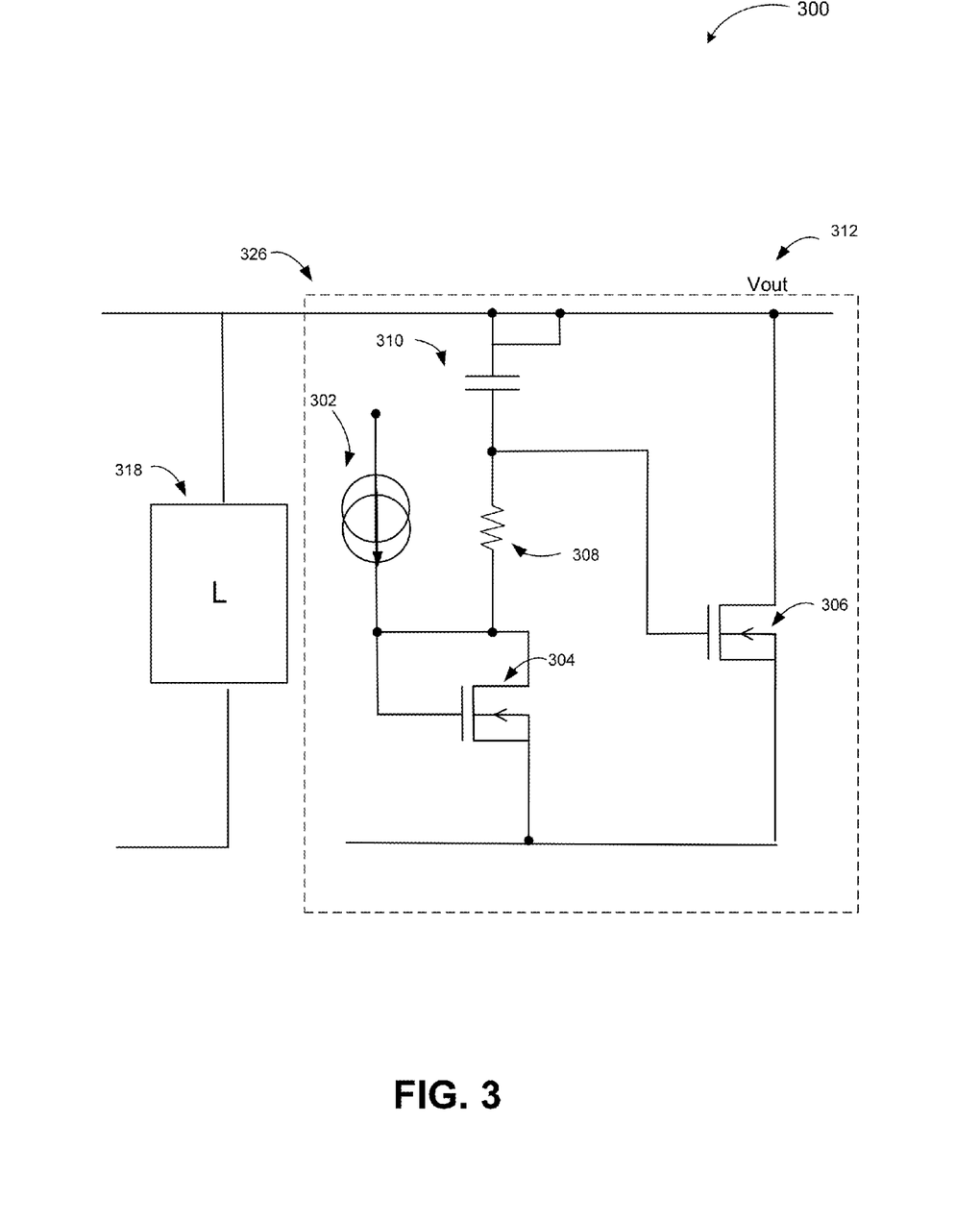
FIG. 3 illustrates an example scalable voltage regulator coupled with an overshoot suppressor circuit.

FIG. 3 illustrates an example scalable voltage regulator coupled with an overshoot suppressor circuit, arranged in accordance with at least some embodiments described herein.

As shown in a diagram 300, an overshoot suppressor circuit 326 may include a current source 302, one or more transistors 304 and 306, a resistor 308, and a capacitor 310. The overshoot suppressor circuit 326 may be coupled to a load 318 of a voltage regulator implemented as an IC, such as the voltage regulator described in FIG. 3. In addition to one or more components of the voltage regulator, the overshoot suppressor circuit 326 may also be selected to be scaled. A range of scaling factors may be identified for the overshoot suppressor circuit 326, and an optimal coefficient for the scaling factors with which the overshoot suppressor circuit 326 is to be scaled may be determined within the identified range through an empirical formulation and/or by running a circuit simulation. The overshoot suppressor circuit 326 may further be coupled to a load 318 in a parallel orientation.

As discussed previously, sudden changes in a current consumed by the load 318 may cause transient fluctuations of an output voltage 312. The overshoot suppressor circuit 326 may be configured to reduce a rise of the output voltage 312 when a current consumed by the load 318 suddenly changes from a high current to a low current, termed an overshoot.

Within the overshoot suppressor circuit 326, the current source 302 may be coupled to at least one transistor, such as transistor 304, and the resistor 308. The resistor 308 may further be coupled to the transistor 304, the transistor 306, and the capacitor 310. The transistors 304 and 306 may be field-effect transistors (FETs), for example. More specifically, the transistors 304 and 306 may be N-type metal-oxide-semiconductor logic (NMOS) transistors or P-type metal-oxide-semiconductor logic (PMOS) transistors, where the PMOS transistors are in a mirrored configuration. The NMOS transistors may be preferred due to a driving capability over double a magnitude of the PMOS transistors of comparable size.

The capacitor 310 may have a capacitance value (C) ten times greater than a value of a gate capacitance of the transistor 306. The resistor 308 may be selected such that the resistance value (R) enables a time constant in equation t=RC to be about two to four times of the response time of the main regulation loop. For example, C may be in a range from about 1 pF to about 20 pF, and R may be in a range from about 20 kOhm to about 500 kOhm.

Figure 4:
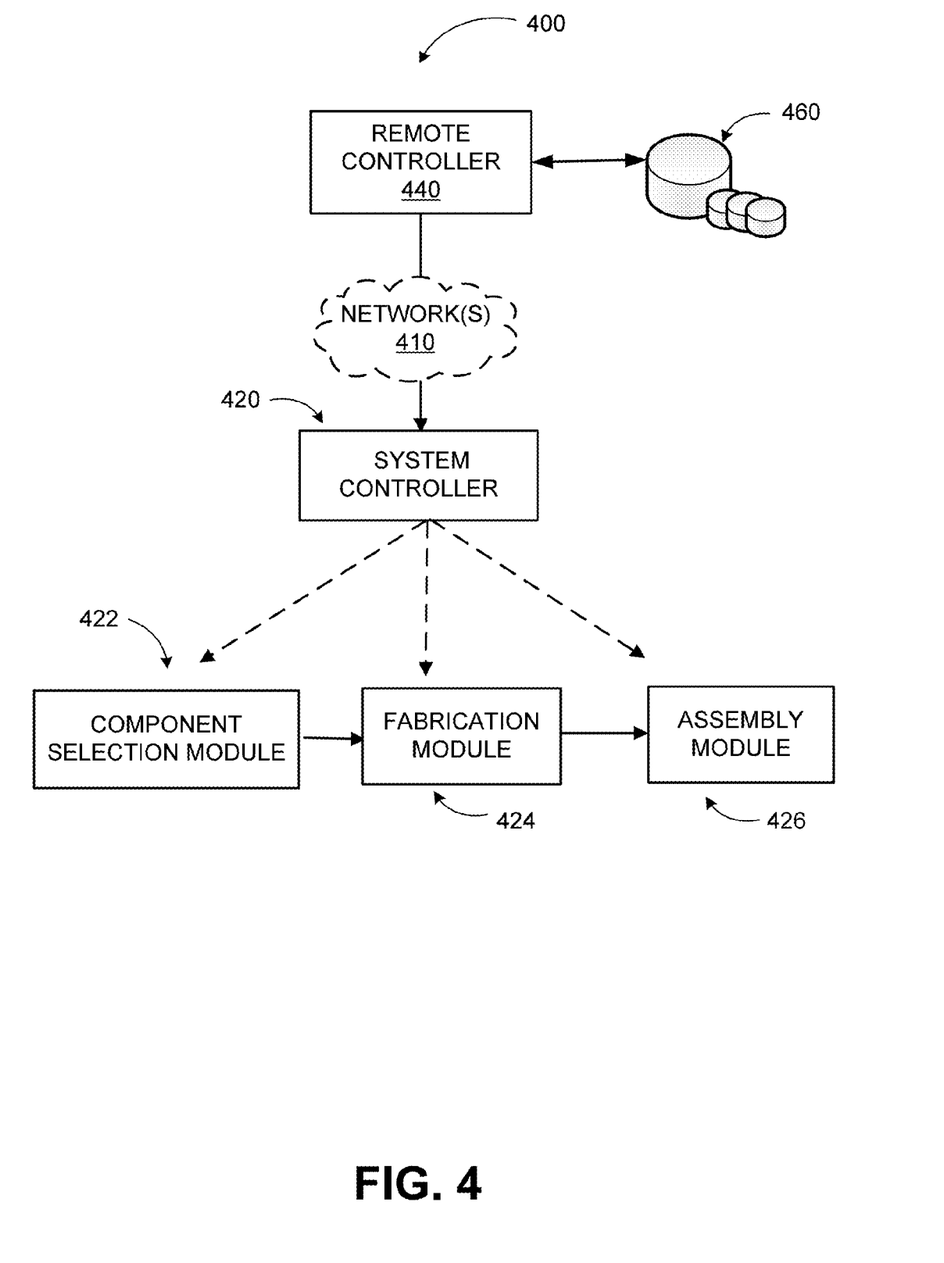
FIG. 4 illustrates an example system to scale a voltage regulator to achieve optimized performance.

FIG. 4 illustrates an example system to scale a voltage regulator to achieve optimized performance, arranged in accordance with at least some embodiments described herein.

System 400 may include a system controller 420, a component selection module 422, a fabrication module 424, and an assembly module 426. The system controller 420 may be operated by human control or may be configured for automatic operation, or may be directed by a remote controller 440 through at least one network (for example, via network 410). Data associated with controlling the different processes of circuit board fabrication may be stored at and/or received from data stores 460.

The system controller 420 may include or control the component selection module 422, where the component selection module 422 may configured to select one or more components of a voltage regulator to scale. The selected component(s) may be a power transistor, an error amplifier, a first unity gain buffer, a second unity gain buffer, one or more compensation capacitors, and/or an overshoot suppressor circuit, for example. The system controller 420 may also include or control the fabrication module 424, where the fabrication module 424 may be configured to fabricate the selected component(s) to scale based on an optimal coefficient or combination of optimal coefficients determined for scaling factors associated with the selected component(s) within an identified range of coefficients for the scaling factors. The fabrication module 424 may also be configured to fabricate remaining components of the voltage regulator. The system controller 420 may further include or control the assembly module 426, where the assembly module 426 may be configured to assemble the selected component(s) that have been scaled along with the remaining components to form the voltage regulator. The inclusion of the scaled component(s) may enable optimized performance of the voltage regulator to be achieved.

The component selection module 422, the fabrication module 424, and the assembly module 426 may be software, hardware, firmware, or virtually any combination thereof. In one embodiment, the modules may be implemented via Application Specific Integrated Circuits (ASICs), Field Programmable Gate Arrays (FPGAs), digital signal processors (DSPs), or other integrated formats, for example.

The examples in FIGS. 1 through 4 have been described using specific components, ranges, parameters, and methods to scale a voltage regulator. Embodiments to scale a voltage regulator are not limited to the specific components, ranges, parameters, and methods according to these examples.

Scalability of one or more components of a voltage regulator may enable optimization of voltage regulator performance. For example, based on a range of load capacitance and a range of current associated with the voltage regulator, at least one appropriate component may be selected to be scaled. A range of scaling factors may be identified for the component, and an optimal coefficient may be determined for the scaling factors within the identified range, where the optimal coefficient is a coefficient that when applied to the component optimizes the performance of the voltage regulator. The component then may be scaled based on the optimal coefficient such that the performance of the voltage regulator is optimized. Furthermore, a design of the scalable voltage regulator, according to the above described embodiments, may also an increase in a stability of the voltage regulator and/or minimization of fluctuations in output voltage in response to sudden changes in a current consumed by a load of the voltage regulator.

Figure 5:
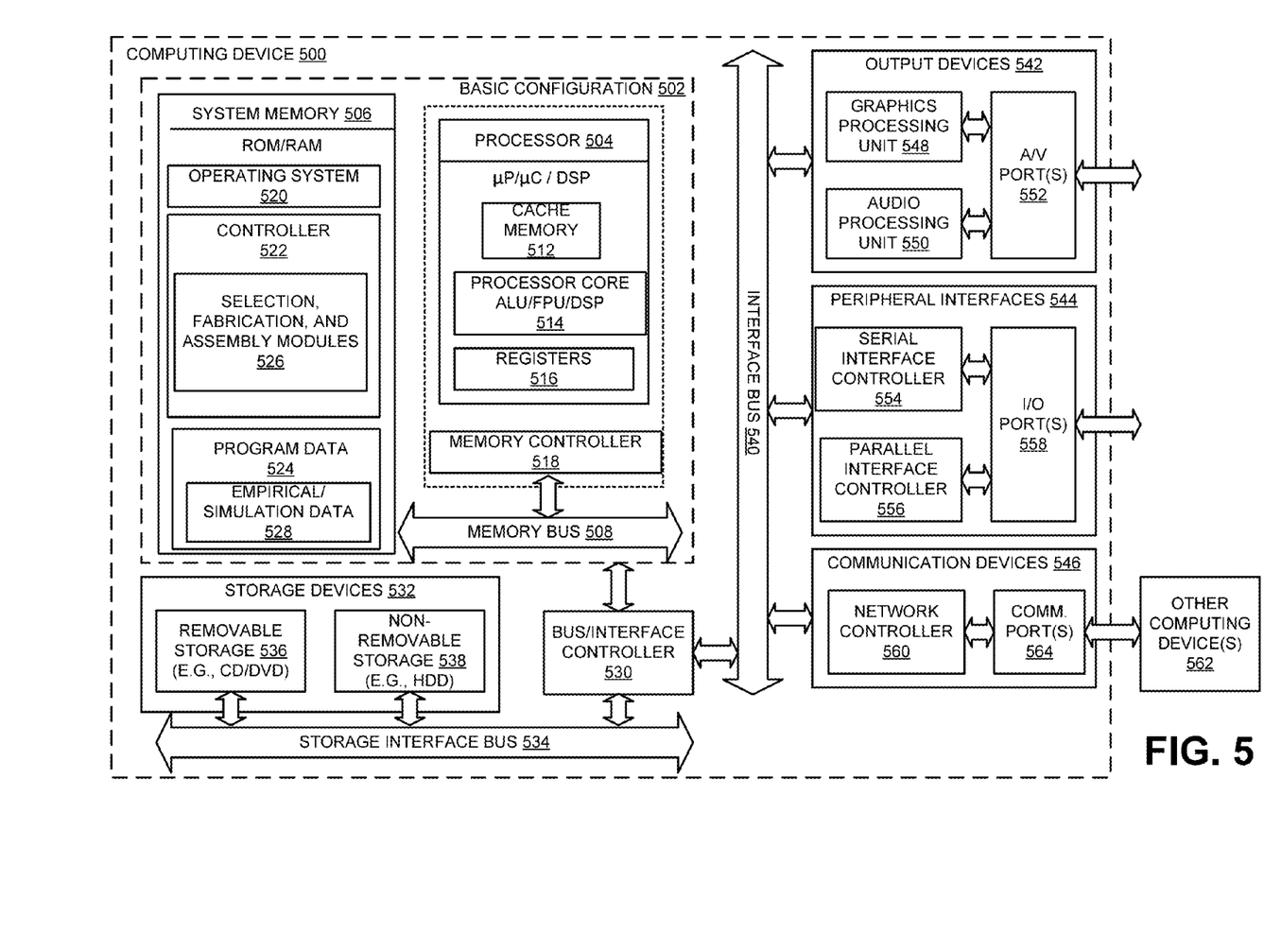
FIG. 5 illustrates a general purpose computing device, which may be used to scale a voltage regulator.

FIG. 5 illustrates a general purpose computing device, which may be used to scale a voltage regulator, arranged in accordance with at least some embodiments described herein.

For example, the computing device 500 may be used as a server, desktop computer, portable computer, smart phone, special purpose computer, or similar device such as a controller, a new component, a cluster of existing components in an operational system including a vehicle and a smart dwelling. In an example basic configuration 502, the computing device 500 may include one or more processors 504 and a system memory 506. A memory bus 508 may be used for communicating between the processor 504 and the system memory 506. The basic configuration 502 is illustrated in FIG. 5 by those components within the inner dashed line.

Depending on the desired configuration, the processor 504 may be of any type, including but not limited to a microprocessor (µP), a microcontroller (µC), a digital signal processor (DSP), or any combination thereof. The processor 504 may include one more levels of caching, such as a level cache memory 512, one or more processor cores 514, and registers 516. The example processor cores 514 may (each) include an arithmetic logic unit (ALU), a floating point unit (FPU), a digital signal processing core (DSP Core), or any combination thereof. An example memory controller 518 may also be used with the processor 504, or in some implementations the memory controller 518 may be an internal part of the processor 504.

Depending on the desired configuration, the system memory 506 may be of any type including but not limited to volatile memory (such as RAM), non-volatile memory (such as ROM, flash memory, etc.) or any combination thereof. The system memory 506 may include an operating system 520, a controller 522, and program data 524. The controller 522 may include and/or control one or more modules 526, which may be integral parts of the controller or a separate modules on their own. The controller 522 may include or control a component selection module configured to select at least one component of the voltage regulator to scale. The controller 522 may also include or control a fabrication module configured to fabricate the at least one component to scale based on an optimal coefficient determined for scaling factors associated with the at least one component within an identified range of coefficients for the scaling factors. The optimal coefficient may be determined through empirical formulation and/or circuit simulation, for example. The controller 522 may include or control an assembly module configured to assemble the selected component that has been scaled along with the remaining components to form the voltage regulator. The program data 524 may include, among other data, empirical data or simulation data 528 related to determination of the optimal coefficient, as described herein.

The computing device 500 may have additional features or functionality, and additional interfaces to facilitate communications between the basic configuration 502 and any desired devices and interfaces. For example, a bus/interface controller 530 may be used to facilitate communications between the basic configuration 502 and one or more data storage devices 532 via a storage interface bus 534. The data storage devices 532 may be one or more removable storage devices 536, one or more non-removable storage devices 538, or a combination thereof. Examples of the removable storage and the non-removable storage devices include magnetic disk devices such as flexible disk drives and hard-disk drives (HDD), optical disk drives such as compact disk (CD) drives or digital versatile disk (DVD) drives, solid state drives (SSD), and tape drives to name a few. Example computer storage media may include volatile and nonvolatile, removable and non-removable media implemented in any method or technology for storage of information, such as computer readable instructions, data structures, program modules, or other data.

The system memory 506, the removable storage devices 536 and the non-removable storage devices 538 are examples of computer storage media. Computer storage media includes, but is not limited to, RAM, ROM, EEPROM, flash memory or other memory technology, CD-ROM, digital versatile disks (DVDs), solid state drives, or other optical storage, magnetic cassettes, magnetic tape, magnetic disk storage or other magnetic storage devices, or any other medium which may be used to store the desired information and which may be accessed by the computing device 500. Any such computer storage media may be part of the computing device 500.

The computing device 500 may also include an interface bus 540 for facilitating communication from various interface devices (for example, one or more output devices 542, one or more peripheral interfaces 544, and one or more communication devices 546) to the basic configuration 502 via the bus/interface controller 530. Some of the example output devices 542 include a graphics processing unit 548 and an audio processing unit 550, which may be configured to communicate to various external devices such as a display or speakers via one or more A/V ports 552. One or more example peripheral interfaces 544 may include a serial interface controller 554 or a parallel interface controller 556, which may be configured to communicate with external devices such as input devices (for example, keyboard, mouse, pen, voice input device, touch input device, etc.) or other peripheral devices (for example, printer, scanner, etc.) via one or more I/O ports 558. An example communication device 546 includes a network controller 560, which may be arranged to facilitate communications with one or more other computing devices 562 over a network communication link via one or more communication ports 564. The one or more other computing devices 562 may include servers, client devices, and comparable devices.

The network communication link may be one example of a communication media. Communication media may typically be embodied by computer readable instructions, data structures, program modules, or other data in a modulated data signal, such as a carrier wave or other transport mechanism, and may include any information delivery media. A "modulated data signal" may be a signal that has one or more of its characteristics set or changed in such a manner as to encode information in the signal. By way of example, and not limitation, communication media may include wired media such as a wired network or direct-wired connection, and wireless media such as acoustic, radio frequency (RF), microwave, infrared (IR) and other wireless media. The term computer readable media as used herein may include both storage media and communication media.

The computing device 500 may be implemented as a part of a general purpose or specialized server, mainframe, or similar computer that includes any of the above functions. The computing device 500 may also be implemented as a personal computer including both laptop computer and non-laptop computer configurations.

Example embodiments may also include methods to scale a voltage regulator. These methods can be implemented in any number of ways, including the structures described herein. One such way may be by machine operations, of devices of the type described in the present disclosure. Another optional way may be for one or more of the individual operations of the methods to be performed in conjunction with one or more human operators performing some of the operations while other operations may be performed by machines. These human operators need not be collocated with each other, but each can be only with a machine that performs a portion of the program. In other embodiments, the human interaction can be automated such as by pre-selected criteria that may be machine automated.

Figure 6:
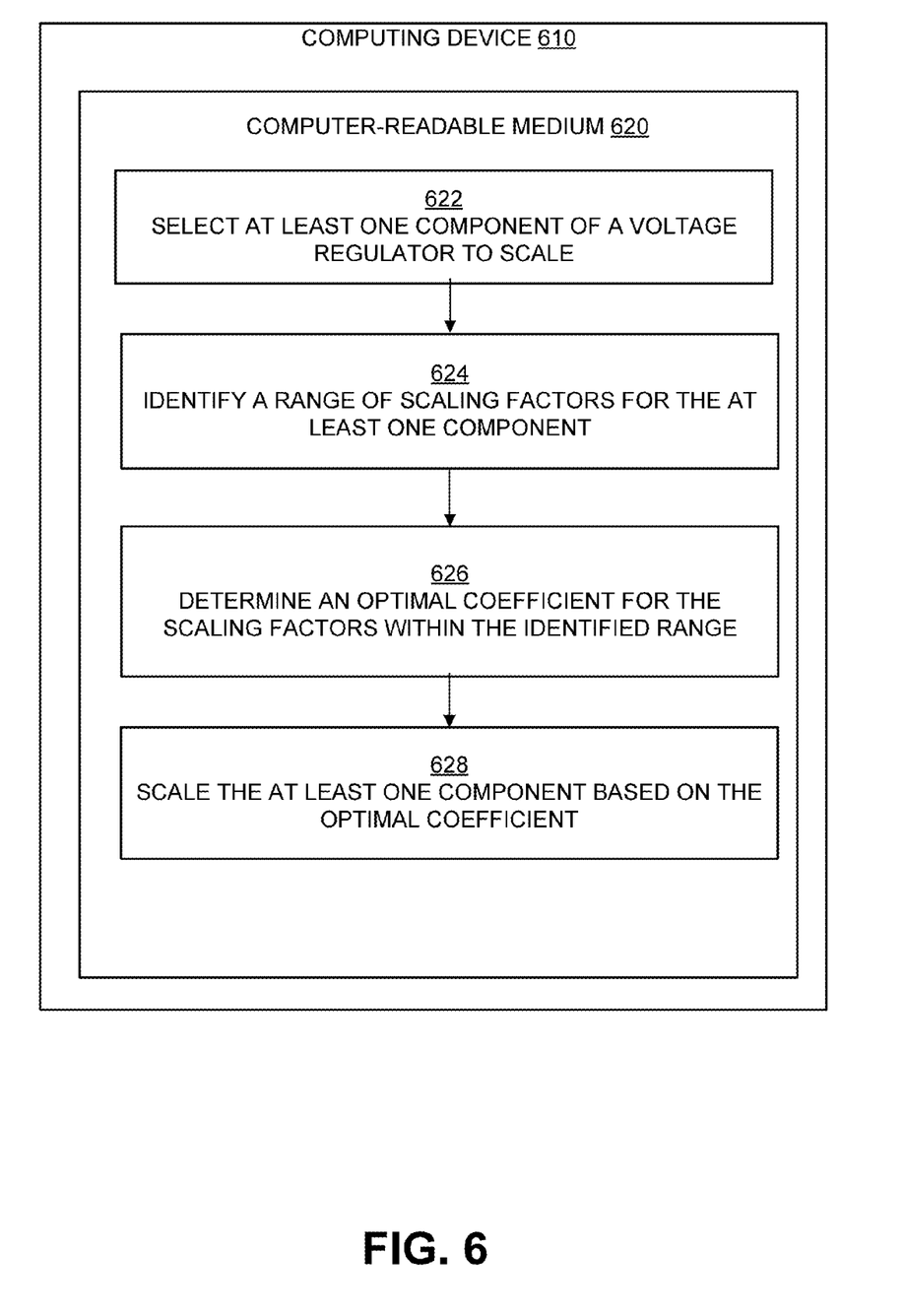
FIG. 6 is a flow diagram illustrating an example process to scale a voltage regulator that may be performed by a computing device such as the computing device in FIG. 5.

FIG. 6 is a flow diagram illustrating an example process to scale a voltage regulator that may be performed by a computing device such as the computing device in FIG. 5, arranged in accordance with at least some embodiments described herein.

Example methods may include one or more operations, functions or actions as illustrated by one or more of blocks 622, 624, 626 and/or 628. The operations described in the blocks 622 through 628 may also be stored as computer-executable instructions in a computer-readable medium such as a computer-readable medium 620 of a computing device 610.

An example process to scale a voltage regulator may begin with block 622, "SELECT AT LEAST ONE COMPONENT OF A VOLTAGE REGULATOR TO SCALE," where a component selection module may be configured to select at least one component of the voltage regulator to be scaled. The component to be scaled may be selected based on a range of load capacitance and a range of current associated with the voltage regulator, for example. The component may include a power transistor, an error amplifier, a first unity gain buffer, a second unity gain buffer, one or more compensation capacitors, and/or an overshoot suppressor circuit. In some embodiments, the voltage regulator may be implemented as an IC.

Block 622 may be followed by block 624, "IDENTIFY A RANGE OF SCALING FACTORS FOR THE AT LEAST ONE COMPONENT," where a range of scaling factors may be identified for the component. The range may include one or more coefficients for the scaling factors.

Block 624 may be followed by block 626, "DETERMINE AN OPTIMAL COEFFICIENT WITHIN THE IDENTIFIED RANGE," where an optimal coefficient for the scaling factors for the component is determined within the identified range through empirical formulation and/or circuit simulation. For example, an empirical formula for a function that defines a relationship between IC parameters and the coefficients for the scaling factors may be drafted. The formula may then be solved to calculate the optimal coefficient for the scaling factors of the component for given circuit parameters. Alternatively, the optimal coefficient may be determined by applying each coefficient within the identified range to the component to simulate a performance of the IC under different sets of operating conditions, where data comprising numerical values of simulated parameters for each given coefficient of the scaling factors for the component within the identified range may be extracted from the simulation results. The data may be stored within a searchable database to enable efficient identification of an optimal coefficient, which when implemented for the scalable voltage regulator will cause the voltage regulator to demonstrate optimal parameters for a given set of operating conditions.

When two or more components are selected for scaling, an optimal combination of coefficients for the scaling factors of the components may be determined by applying each coefficient within the identified range of scaling factors for each component to each corresponding component to simulate the performance of the voltage regulator for all possible combinations. Simulation may be repeated for each unique combination of coefficients and operating conditions, and the simulated parameters can be extracted from simulation results. The extracted simulated parameters may be stored in the searchable database to enable efficient identification of an optimal combination of coefficients for the two or more components of the voltage regulator, which when implemented for the scalable voltage regulator will cause the IC to demonstrate optimal parameters for a given set of operating conditions.

Block 626 may be followed by block 628, "SCALE THE AT LEAST ONE COMPONENT BASED ON THE OPTIMAL COEFFICIENT," where a fabrication module may be configured to fabricate the component to scale based on the optimal coefficient such that an optimized performance of the IC may be achieved. An assembly module may then be configured to assemble the scaled component and remaining one or more components of the voltage regulator. In some examples, the voltage regulator may be assembled with additional circuitry such that the components may be scaled during operation of the voltage regulator, in response to changes in IC parameters, and thus changes to the optimal coefficients for each component.

The blocks included in the above described process are for illustration purposes. Scaling of a voltage regulator may be implemented by similar processes with fewer or additional blocks. In some embodiments, the blocks may be performed in a different order. In some other embodiments, various blocks may be eliminated. In still other embodiments, various blocks may be divided into additional blocks, or combined together into fewer blocks.

Figure 7:
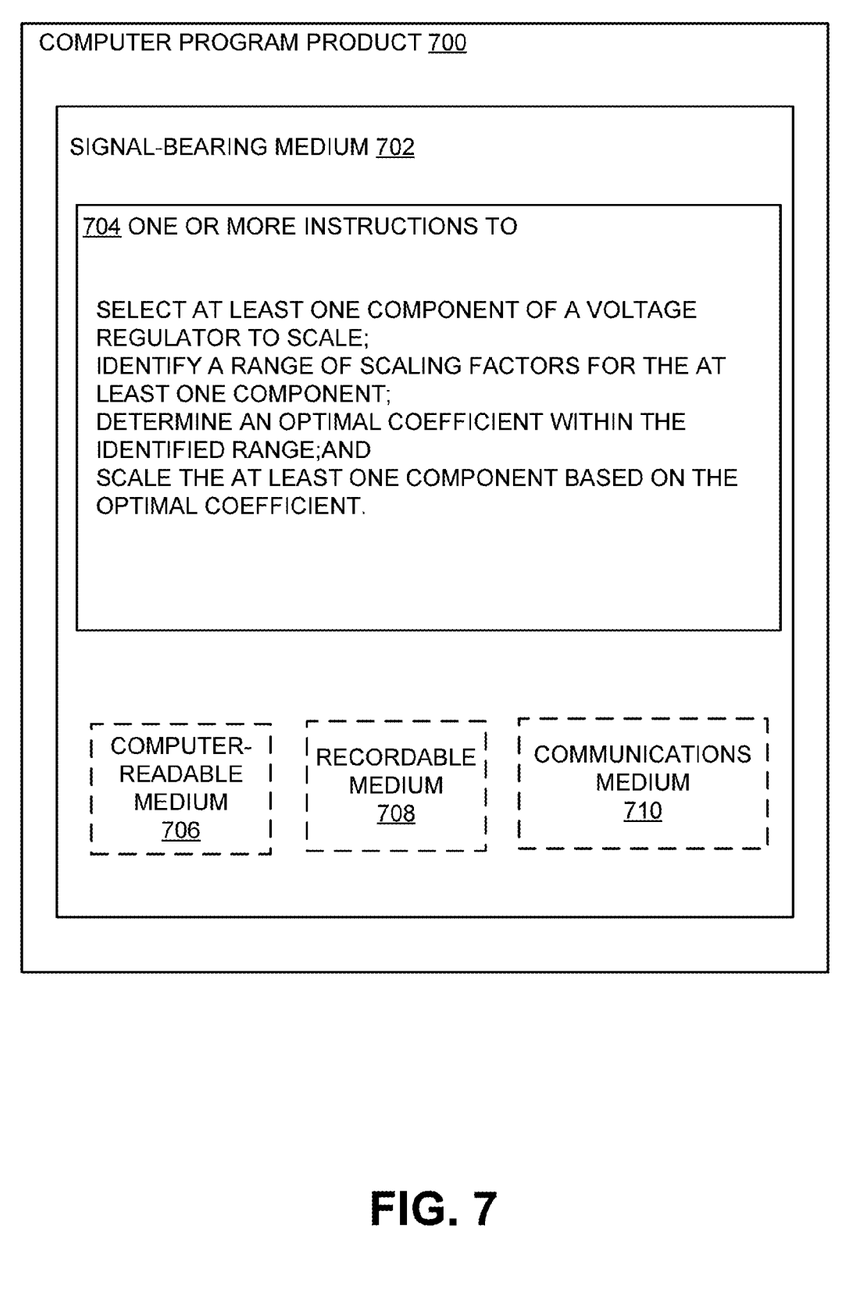
FIG. 7 illustrates a block diagram of an example computer program product, all arranged in accordance with at least some embodiments described herein.

FIG. 7 illustrates a block diagram of an example computer program product, arranged in accordance with at least some embodiments described herein.

In some embodiments, as shown in FIG. 7, the computer program product 700 may include a signal bearing medium 702 that may also include one or more machine readable instructions 704 that, when executed by, for example, a processor, may provide the functionality described herein. Thus, for example, referring to the processor 504 in FIG. 5, the modules 526 executed on the processor 504 may undertake one or more of the tasks shown in FIG. 7 in response to the instructions 704 conveyed to the processor 504 by the medium 702 to perform actions associated with scaling a voltage regulator as described herein. Some of those instructions may include, for example, one or more instructions to select at least one component of a voltage regulator to scale, identify a range of scaling factors for the at least one component, determine an optimal coefficient within the identified range, and scale the at least one component based on the optimal coefficient.

In some implementations, the signal bearing medium 702 depicted in FIG. 7 may encompass a computer-readable medium 706, such as, but not limited to, a hard disk drive, a solid state drive, a Compact Disc (CD), a Digital Versatile Disk (DVD), a digital tape, memory, etc. In some implementations, the signal bearing medium 702 may encompass a recordable medium 708, such as, but not limited to, memory, read/write (R/W) CDs, R/W DVDs, etc. In some implementations, the signal bearing medium 702 may encompass a communications medium 710, such as, but not limited to, a digital and/or an analog communication medium (for example, a fiber optic cable, a waveguide, a wired communications link, a wireless communication link, etc.). Thus, for example, the program product 700 may be conveyed to one or more modules of the processor 504 of FIG. 5 by an RF signal bearing medium, where the signal bearing medium 702 is conveyed by the wireless communications medium 710 (for example, a wireless communications medium conforming with the IEEE 802.11 standard).

According to some examples, methods to scale a voltage regulator to achieve optimized performance are provided. An example method may include selecting at least one component of the voltage regulator to scale, identifying a range of scaling factors for the component, the range comprising one or more coefficients for the scaling factors, determining an optimal coefficient for the scaling factors within the identified range for the component, and scaling the component based on the optimal coefficient such that an optimized performance of the voltage regulator is achieved.

In other examples, the component may be selected based on a range of load capacitance and a range of current associated with the voltage regulator. The determination of the optimal coefficient for the scaling factors within the identified range may include application of each coefficient within the identified range to the component to simulate a performance of the voltage regulator, and determination of a coefficient that when applied to the component optimizes the performance of the voltage regulator. The simulation may be based on a target output voltage, a minimum input voltage, a maximum input voltage, a maximum load current, a minimal load capacitance, a maximal load capacitance, and/or a maximum instant change of the load current.

In further examples, in response to two or more components being selected for scaling, the range of scaling factors may be identified for each component, each coefficient within the identified range may be applied to each corresponding component to simulate the performance of the voltage regulator such that all combinations of coefficients among the components are simulated, and an optimal coefficient may be determined for each component such that when applied in combination with each other component, the performance of the voltage regulator is optimized. The components may include a power transistor, an error amplifier, a first unity gain buffer, a second unity gain buffer, one or more compensation capacitors, and/or an overshoot suppressor circuit.

According to some embodiments, scalable voltage regulators are described. An example scalable voltage regulator may include a power transistor configured to receive an input voltage from a voltage source and convert the input voltage to an output voltage, and a feedback loop configured to regulate the output voltage in response to a change of output voltage from a desired level caused by a change of a current consumed by a load or changes of other operating conditions. The feedback loop may include an error amplifier configured to determine a value difference between the output voltage or portion of the output voltage and a reference output voltage, and amplify the value difference. The feedback loop may also include a voltage divider, where an input of the voltage divider is coupled to an output of the voltage regulator, and an output of the voltage divider is coupled to an input of the error amplifier, the voltage divider configured to receive an output voltage of the voltage regulator, and generate voltage proportional to an input voltage of the voltage divider with a specific ratio. The feedback loop may further include a first unity gain buffer coupled to the power transistor and the error amplifier, the first unity gain buffer configured to receive a first control signal based on the output voltage of the error amplifier, and provide a second control signal to the power transistor without signal amplification or attenuation. One or more of the power transistor, the error amplifier, and the first unity gain buffer are selected to be scaled based on a range of load capacitance and a range of current associated with the voltage regulator such that an optimized performance of the voltage regulator is achieved.

In other embodiments, a second unity gain buffer, one or more compensation capacitors, and/or an overshoot suppressor circuit may be further selected to be scaled based on the range of load capacitance and the range of current associated with the voltage regulator such that the optimized performance of the voltage regulator is achieved. A second unity gain buffer may be coupled to the power transistor, where the second unity gain buffer may be configured to reduce an output voltage drop when the current consumed by the load is changed from a low current to a high current. The first unity gain buffer and the second unity gain buffer may be transistors in a common base configuration or a common gate configuration. The scalable voltage regulator may further include a compensation capacitor between at least one of the first unity gain buffer and the output of the voltage regulator, and the second unity gain buffer and the output of the voltage regulator.

In further embodiments, an overshoot suppressor circuit may be coupled to the load in a parallel orientation, where the overshoot suppressor circuit may be configured to reduce an output voltage rise when the current consumed by the load is changed from a high current to a low current. The scalable voltage regulator may further include a compensation capacitor between an output of the error amplifier and the output of the voltage regulator. The error amplifier may be an OTA. The voltage divider may be a resistive divider. The voltage regulator may be implemented as an IC.

According to some examples, systems to scale a voltage regulator to achieve optimized performance are provided. An example system may include a component selection module configured to select at least one component of the voltage regulator to scale, where the component may be a power transistor, an error amplifier, a first unity gain buffer, a second unity gain buffer, one or more compensation capacitors, or an overshoot suppressor circuit. The example system may also include a fabrication module configured to fabricate the component to scale based on an optimal coefficient, where a range of scaling factors, comprising one or more coefficients for the scaling factors, may be identified for the component, and the optimal coefficient may be determined for the scaling factors within the identified range for the component. The example system may further include an assembly module configured to assemble the scaled component with one or more remaining components to form the voltage regulator, and a controller configured to coordinate operations of the component selection module, the fabrication module, and the assembly module.

In other embodiments, a size of the power transistor may be selected based on a maximum load current and a minimum input voltage requirement. A size of the power transistor may be selected based on one or more design rules. A size of the power transistor may be selected such that multiplication is enabled.

There are various vehicles by which processes and/or systems and/or other technologies described herein may be effected (for example, hardware, software, and/or firmware), and that the preferred vehicle will vary with the context in which the processes and/or systems and/or other technologies are deployed. For example, if an implementer determines that speed and accuracy are paramount, the implementer may opt for a mainly hardware and/or firmware vehicle; if flexibility is paramount, the implementer may opt for a mainly software implementation; or, yet again alternatively, the implementer may opt for some combination of hardware, software, and/or firmware.

While various compositions, methods, systems, and devices are described in terms of "comprising" various components or steps (interpreted as meaning "including, but not limited to"), the compositions, methods, systems, and devices can also "consist essentially of" or "consist of" the various components and steps, and such terminology should be interpreted as defining essentially closed-member groups."

The foregoing detailed description has set forth various embodiments of the devices and/or processes via the use of block diagrams, flowcharts, and/or examples. Insofar as such block diagrams, flowcharts, and/or examples contain one or more functions and/or operations, each function and/or operation within such block diagrams, flowcharts, or examples may be implemented, individually and/or collectively, by a wide range of hardware, software, firmware, or virtually any combination thereof. In one embodiment, several portions of the subject matter described herein may be implemented via Application Specific Integrated Circuits (ASICs), Field Programmable Gate Arrays (FPGAs), digital signal processors (DSPs), or other integrated formats. However, some aspects of the embodiments disclosed herein, in whole or in part, may be equivalently implemented in integrated circuits, as one or more computer programs running on one or more computers (for example, as one or more programs running on one or more computer systems), as one or more programs running on one or more processors (for example as one or more programs running on one or more microprocessors), as firmware, or as virtually any combination thereof, and that designing the circuitry and/or writing the code for the software and or firmware would be possible in light of this disclosure.

The present disclosure is not to be limited in terms of the particular embodiments described in this application, which are intended as illustrations of various aspects. Many modifications and variations can be made without departing from its spirit and scope. Functionally equivalent methods and apparatuses within the scope of the disclosure, in addition to those enumerated herein, will be possible from the foregoing descriptions. Such modifications and variations are intended to fall within the scope of the appended claims. The present disclosure is to be limited only by the terms of the appended claims, along with the full scope of equivalents to which such claims are entitled. It is to be understood that this disclosure is not limited to particular methods, systems, or components, which can, of course, vary. It is also to be understood that the terminology used herein is for the purpose of describing particular embodiments only, and is not intended to be limiting.

In addition, the mechanisms of the subject matter described herein are capable of being distributed as a program product in a variety of forms, and that an illustrative embodiment of the subject matter described herein applies regardless of the particular type of signal bearing medium used to actually carry out the distribution. Examples of a signal bearing medium include, but are not limited to, the following: a recordable type medium such as a floppy disk, a hard disk drive, a Compact Disc (CD), a Digital Versatile Disk (DVD), a digital tape, a computer memory, etc.; and a transmission type medium such as a digital and/or an analog communication medium (for example, a fiber optic cable, a waveguide, a wired communications link, a wireless communication link, etc.).

Those skilled in the art will recognize that it is common within the art to describe devices and/or processes in the fashion set forth herein, and thereafter use engineering practices to integrate such described devices and/or processes into data processing systems. That is, at least a portion of the devices and/or processes described herein may be integrated into a data processing system via a reasonable amount of experimentation. Those having skill in the art will recognize that a typical data processing system generally includes one or more of a system unit housing, a video display device, a memory such as volatile and non-volatile memory, processors such as microprocessors and digital signal processors, computational entities such as operating systems, drivers, graphical user interfaces, and applications programs, one or more interaction devices, such as a touch pad or screen, and/or control systems including feedback loops.

The herein described subject matter sometimes illustrates different components contained within, or connected with, different other components. It is to be understood that such depicted architectures are merely exemplary, and that in fact many other architectures may be implemented which achieve the same functionality. In a conceptual sense, any arrangement of components to achieve the same functionality is effectively "associated" such that particular functionality is achieved. Hence, any two components herein combined to achieve a particular functionality may be seen as "associated with" each other such that the particular functionality is achieved, irrespective of architectures or intermediate components. Likewise, any two components so associated may also be viewed as being "operably connected", or "operably coupled", to each other to achieve the particular functionality, and any two components capable of being so associated may also be viewed as being "operably couplable", to each other to achieve the particular functionality. Specific examples of operably couplable include but are not limited to physically connectable and/or physically interacting components and/or wirelessly interactable and/or wirelessly interacting components and/or logically interacting and/or logically interactable components.

With respect to the use of substantially any plural and/or singular terms herein, those having skill in the art can translate from the plural to the singular and/or from the singular to the plural as is appropriate to the context and/or application. The various singular/plural permutations may be expressly set forth herein for sake of clarity.

It will be understood by those within the art that, in general, terms used herein, and especially in the appended claims (for example, bodies of the appended claims) are generally intended as "open" terms (for example, the term "including" should be interpreted as "including but not limited to," the term "having" should be interpreted as "having at least," the term "includes" should be interpreted as "includes but is not limited to," etc.). It will be further understood by those within the art that if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to embodiments containing only one such recitation, even when the same claim includes the introductory phrases "one or more" or "at least one" and indefinite articles such as "a" or "an" (for example, "a" and/or "an" should be interpreted to mean "at least one" or "one or more"); the same holds true for the use of definite articles used to introduce claim recitations. In addition, even if a specific number of an introduced claim recitation is explicitly recited, those skilled in the art will recognize that such recitation should be interpreted to mean at least the recited number (for example, the bare recitation of "two recitations," without other modifiers, means at least two recitations, or two or more recitations).

Furthermore, in those instances where a convention analogous to "at least one of A, B, and C, etc." is used, in general such a construction is intended in the sense one having skill in the art would understand the convention (for example, "a system having at least one of A, B, and C" would include but not be limited to systems that have A alone, B alone, C alone, A and B together, A and C together, B and C together, and/or A, B, and C together, etc.). It will be further understood by those within the art that virtually any disjunctive word and/or phrase presenting two or more alternative terms, whether in the description, claims, or drawings, should be understood to contemplate the possibilities of including one of the terms, either of the terms, or both terms. For example, the phrase "A or B" will be understood to include the possibilities of "A" or "B" or "A and B."

As will be understood by one skilled in the art, for any and all purposes, such as in terms of providing a written description, all ranges disclosed herein also encompass any and all possible subranges and combinations of subranges thereof. Any listed range can be easily recognized as sufficiently describing and enabling the same range being broken down into at least equal halves, thirds, quarters, fifths, tenths, etc. As a non-limiting example, each range discussed herein can be readily broken down into a lower third, middle third and upper third, etc. As will also be understood by one skilled in the art all language such as "up to," "at least," "greater than," "less than," and the like include the number recited and refer to ranges which can be subsequently broken down into subranges as discussed above. Finally, as will be understood by one skilled in the art, a range includes each individual member. Thus, for example, a group having 1-3 cells refers to groups having 1, 2, or 3 cells. Similarly, a group having 1-6 cells refers to groups having 1, 2, 3, 4, or 5 cells, and so forth.

While various aspects and embodiments have been disclosed herein, other aspects and embodiments are possible. The various aspects and embodiments disclosed herein are for purposes of illustration and are not intended to be limiting, with the true scope and spirit being indicated by the following claims.

What is claimed is:

1. A method to scale a voltage regulator comprising:
  receiving, at a power transistor of the voltage regulator, an input voltage from a voltage source, wherein the power transistor is configured to convert the input voltage to an output voltage; and
  in response to a change of output voltage from a desired level caused by a change of a current consumed by a load or changes of other operating conditions, regulating, by a feedback loop of the voltage regulator, the output voltage, wherein:
    the feedback loop comprises:
      an error amplifier configured to:
        determine a value difference between the output voltage or portion of the output voltage and a reference output voltage; and amplify the value difference;
a voltage divider, wherein an input of the voltage divider is coupled to an output of the voltage regulator, and an output of the voltage divider is coupled to an input of the error amplifier, the voltage divider configured to:
receive an output voltage of the voltage regulator; and
generate voltage proportional to an input voltage of the voltage divider with a specific ratio;
a first unity gain buffer coupled to the power transistor and the error amplifier, the first unity gain buffer configured to:
receive a first control signal based on the output voltage of the error amplifier; and
provide a second control signal to the power transistor without signal amplification or attenuation; and
a second unity gain buffer coupled to the power transistor, the second unity gain buffer configured to reduce an output voltage drop when the current consumed by the load is changed from a low current to a high current; and
one or more of the power transistor, the error amplifier, the first unity gain buffer, and the second unity gain buffer are selected to be scaled based on a range of load capacitance and a range of current associated with the voltage regulator such that an optimized performance of the voltage regulator is achieved.

2. The method of claim 1, wherein one or more of one or more compensation capacitors and an overshoot suppressor circuit are further selected to be scaled based on the range of load capacitance and the range of current associated with the voltage regulator such that the optimized performance of the voltage regulator is achieved.

3. The method of claim 1, wherein the first unity gain buffer and the second unity gain buffer are transistors in one of a common base configuration and a common gate configuration.

4. The method of claim 1, wherein the feedback loop further comprises a compensation capacitor between the first unity gain buffer and the output of the voltage regulator, and/or a compensation capacitor between the second unity gain buffer and the output of the voltage regulator.

5. The method of claim 1, wherein the feedback loop further comprises an overshoot suppressor circuit coupled to the load in a parallel orientation, wherein the overshoot suppressor circuit is configured to reduce an output voltage rise when the current consumed by the to is changed from a high current to a low current.

6. The method of claim 1, wherein the feedback loop further comprises a compensation capacitor between an output of the error amplifier and the output of the voltage regulator.

7. The method of claim 1, wherein the error amplifier is an operational trans-conductance amplifier (OTA).

8. The method of claim 1, wherein the voltage divider is a resistive divider.

9. The method of claim 1, wherein the voltage regulator is implemented as an integrated circuit (IC).

10. A system to scale a voltage regulator to achieve optimized performance, the system comprising:
a component selection module configured to select at least one component of the voltage regulator to scale, wherein the voltage regulator comprises:
a power transistor configured to receive an input voltage from a voltage source and convert the input voltage to an output voltage; and
a feedback loop configured to regulate the output voltage in response to a change of output voltage from a desired level caused by a change of a current consumed by a load or changes of other operating conditions, wherein the feedback loop comprises:
an error amplifier configured to:
determine a value difference between the output voltage or portion of the output voltage and a reference output voltage; and
amplify the value difference;
a voltage divider, wherein an input of the voltage divider is coupled to an output of the voltage regulator, and an output of the voltage divider is coupled to an input of the error amplifier, the voltage divider configured to:
receive an output voltage of the voltage regulator; and
generate voltage proportional to an input voltage of the voltage divider with a specific ratio; and
as first unity gain buffer coupled to the power transistor and the error amplifier, the first unity gain buffer configured to:
receive a first control signal based on the output voltage of the error amplifier; and
provide a second control signal to the power transistor without signal amplification or attenuation; and
a second unity gain buffer coupled to the power transistor, the second unity gain buffer configured to reduce an output voltage drop when the current consumed by the load is changed from a low current to a high current;
a fabrication module configured to fabricate the at least one component to scale based on an optimal coefficient, wherein:
a range of scaling factors, comprising one or more coefficients for the scaling factors, is identified for the at least one component, and
the optimal coefficient is determined for the scaling factors within the identified range for the at least one component;
an assembly module configured to assemble the at least one scaled component with one or more remaining components to form the voltage regulator; and
a controller configured to coordinate operations of the component selection module, the fabrication module, and the assembly module.

11. The system of claim 10, wherein the component selection module is further configured to select a size of the power transistor based on a maximum load current and a minimum input voltage requirement.

12. The system of claim 10, wherein the component selection module is further configured to select a size of the power transistor based on one or more design rules.

13. The system of claim 10, wherein the component selection nodule is further configured to select a size of the power transistor such that multiplication enabled.

* * * * *